United States Patent [19]

Gray

[11] Patent Number: 4,983,084

[45] Date of Patent: Jan. 8, 1991

[54] DOUBLE LOCKED THREADED FASTENER

[75] Inventor: Warren E. Gray, Woodland Hills, Calif.

[73] Assignee: Northrop Corporation, Hawthorne, Calif.

[21] Appl. No.: 412,688

[22] Filed: Sep. 26, 1989

[51] Int. Cl.$^5$ .............................................. F16B 39/30
[52] U.S. Cl. .................................. 411/311; 411/361; 411/938
[58] Field of Search ........................................ 411/1-5, 411/277-279, 281, 311, 336, 360, 361, 937.2, 938, 307, 393

[56] References Cited

U.S. PATENT DOCUMENTS

| Re. 31,284 | 6/1983 | Holmes | 411/311 |
|---|---|---|---|
| 4,071,067 | 1/1978 | Goldby | 411/938 X |
| 4,254,809 | 3/1981 | Schuster | 411/277 X |
| 4,341,497 | 7/1982 | Downey et al. | 411/311 |
| 4,649,727 | 3/1987 | Gray | 411/361 X |
| 4,682,520 | 7/1987 | Gray | 411/1 X |
| 4,759,237 | 7/1988 | Faucuet et al. | 411/5 X |
| 4,802,805 | 2/1989 | Hattan | 411/307 X |
| 4,806,054 | 2/1989 | Rath | 411/938 X |
| 4,826,377 | 5/1989 | Holmes | 411/311 |
| 4,840,526 | 6/1989 | Bourdonne | 411/307 X |
| 4,854,794 | 8/1989 | Oertel | 411/307 |

FOREIGN PATENT DOCUMENTS

| 3601389 | 7/1987 | Fed. Rep. of Germany | 411/311 |
|---|---|---|---|
| 2172950 | 10/1986 | United Kingdom | 411/311 |

Primary Examiner—Gary L. Smith
Assistant Examiner—Suzanne L. Dino
Attorney, Agent, or Firm—Terry J. Anderson; Robert B. Block

[57] ABSTRACT

A double locked threaded fastening assembly includes a nut and a bolt. The bolt has a head at one end and threads adjacent its other end with a plurality of axially extending grooves located adjacent to the threads intermediate the threads and the bolt head. The nut has a work piece engagement end and a hollow bore extending through that end into the nut. A first portion of the bore proximal to the work piece engagement end is free of threads and a second portion distal from the work piece engagement end includes internal threads. The internal threads of the nut are capable of threading onto the external threads of the bolt to clamp a work piece under a clamping load between the head of the bolt and the nut. The threads of at least one of the internal threads in the nut or the external threads on the bolt are asymmetrical threads which have an essentially planar inclined root surface which intersects the side of the threads leading the root at a first angle and the side of the thread trailing the root at a second angle. These first and second angles are different. The crest of the opposing mating thread frictionally locks against the inclined rool surface when the nut is brought against the work piece at the clamping load. The first portion of the hollow bore of the nut is then swaged into intimate contact with the grooves on the bolt to fix the nut to the bolt against rotation of the nut on the bolt.

13 Claims, 2 Drawing Sheets

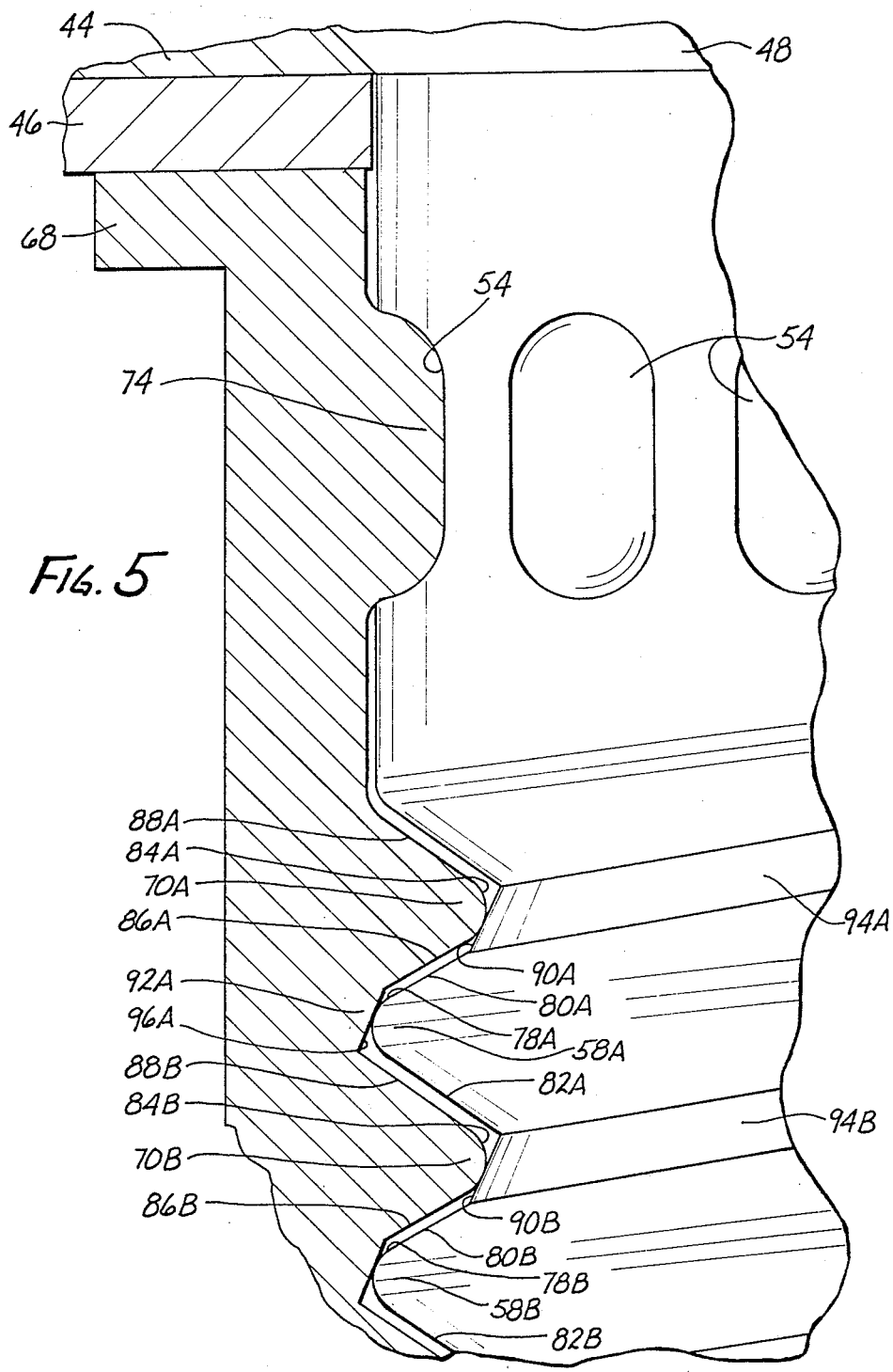

DOUBLE LOCKED THREADED FASTENER

BACKGROUND OF THE INVENTION

This invention is directed to a fastening assembly wherein a nut is doubly locked to an elongated fastener first by frictional engagement of asymmetrical threads and secondly by swaging of portions of the nut into discontinuities on the elongated fastener.

Nuts and bolts are ubiquitously used to attached work pieces together. A common nut and bolt utilizes a common thread to attach the nut to the bolt and clamp the work piece under a clamping load. Such a common thread is generally called a "Unified" thread or an "American Standard" thread. These threads typically have individual threads which have crest and roots formed at about 60° angles. The top of the crests and the bottom of the roots are truncated about a line which is equal to about ⅛ of the pitch of the thread. Similar threads include outdated sharp "V" threads which do not have their crests and roots truncated and the British "Whitworth Standard" threads which utilize a 55° angle between the sides of the threads about the root.

A nut attaching to a bolt by a common thread is subject to being dislodged or worked free from the bolt because of certain environmental conditions. These include vibrations of the work piece on which the bolt and nut are utilized and temperature excursions of the nut and bolt and/or work piece.

The interlock between the nut and the bolt utilizing a common thread concentrates an undue percentage of the load on the first one or two threads with little or no load being carried by the threads which are four or five threads removed from the first thread. Thus, for instance, the first thread can carry upwards of 35% of the load, the second thread 20% of the load, the third thread 15% of the load with the remainder of the load distributed upon the remaining threads. The high concentration of the load on the first engaged thread can lead to bolt failure. This is especially pronounced when soft materials, as for instance, aluminum are utilized for fasteners.

It has been proposed that the undue amount of load concentrated on the first one or two threads occurs because as loading starts on the threads, the male fastener begins to stretch and elongate between the head of the fastener and the first engaged thread. As this happens the first engaged thread starts to deform o deflect. As the clamp load continues to increase the second thread picks up some of the load. However, in order for a significant amount of the load to be transferred to the third, fourth and other ensuing threads, a force high enough to accomplish such ensuing thread loading can cause the first thread to shear or strip. If the first thread strips the load is then concentrated onto the second thread and a chain reaction can occur.

In my prior United States patent, U.S. Pat. No. 4,682,520, entitled MECHANICALLY LOCKABLE FASTENER ASSEMBLY which issued on July 28, 1987 from application Ser. No. 671,823, filed Nov. 15, 1984, and assigned to the same assignee as this application, the entire contents of which are herein incorporated by reference, I describe a fastening system finding great utility in hostile environments. Additionally in that patent I describe other known fasteners which utilized some sort of expedient to fix a nut to a bolt.

The lockable fastener assembly of my U.S. Pat. No. 4,682,520 is very utilitarian and represents a significant advancement in the art over the other fastening systems identified in that patent. In the fastening assembly of that patent, once the work piece is put under a clamping pressure by taking up the nut onto the bolt the nut is permanently fixed to the bolt by swaging material from the nut into grooves formed on the bolt. While the fastening assembly of U.S. Pat. No. 4,682,520 utilizes common threads, irrespective of the loads on the threads the nut material swaged against the bolt permanently locks the nut to the bolt. The swaging of the nut to the bolt additionally serves as a visual indication that the nut is still in place on the bolt.

BRIEF SUMMARY OF THE INVENTION

The present invention provides for an improved fastening assembly which incorporates the principles of swage locking a nut to a bolt for both locking the nut against rotation on the bolt and for providing visual assurance that the nut is still properly torqued on the bolt. The present invention further includes a thread locking system between the nut and bolt to uniformly load the threads and lock the threads of the nut and bolt together. The present invention thus provides for a double lock of a nut to an elongated fastener such as a bolt.

A fastening assembly of the invention has an elongated fastening element and a nut. The elongated fastening element has a retaining means at one end thereof for maintaining the fastening element against axial movement in a first direction in a hole in a work piece to be fastened. The elongated fastening element further includes external threads adjacent its other end with a shank area intermediate the retaining means and the threads. Included on the elongated fastening element is an anti-rotation means for providing a gripping surface opposing rotation about the elongated fastening element. The anti-rotation means is independent of the threads and is located on a portion of the shank area of the bolt adjacent to the threads intermediate the retaining means and the threads. The nut includes a work piece engagement end and a hollow bore extending from said end into the nut. A first portion of the hollow bore proximal to the work piece engagement end of the nut is free of threads. A second portion of the hollow bore distal from the work piece engagement end has internal threads. The internal threads on the second portion of the hollow bore of the nut are capable of threading onto the external threads of the elongated fastening element to clamp a work piece under a clamping load between the elongated fastening element retaining means and the work piece engagement end of the nut. The threads of at least one of the internal and the external threads are asymmetric threads. These asymmetric threads have a thread root of a shape which is noncomplementary to the shape of the thread crest of the opposing mating thread. Because of this the crest of the opposing mating thread frictionally locks against the noncomplementary root when the work piece engagement end of the nut is brought against a work piece at a clamping load. After bringing the nut against the work piece at the clamping load the first portion of the hollow bore of the nut is swaged into intimate contact with the anti-rotation means on the elongated fastening element. This fixes the first portion of the nut to the elongated fastening element against rotation of the nut on the elongated fastening element.

The asymmetric threads can be formed by an essentially planar inclined root surface which intersects the side of the thread leading the root at a first angle and intersects the side of the thread trailing the root at a second angle and wherein the first and second angles are different. The crest of the opposing mating thread then frictionally locks against the inclined surface when the work piece engagement end of the nut is brought against a work piece at a clamping load.

In fastening assemblies of the invention the elongated fastening element can comprise a bolt with the retaining means being a bolt head on the bolt. The hollow bore in the fastener can extend through the nut. Further, the bolt can include a shank area which is a smooth cylindrical area for fitting into a hole in a work piece to be fastened. The smooth cylindrical area would be located adjacent the bolt head between the bolt head and the anti-rotation means. The anti-rotation means can comprise a plurality of grooves axially formed on the bolt adjacent the threads between the threads and the bolt head.

In fastening assemblies of the invention, the asymmetrical threads can be formed on the nut, can be formed on the bolt, or can be formed on both the nut and the bolt.

The nut can be formed with an outside surface shaped as a polygon which is capable of being engaged by a swaging tool to both rotate the nut on the elongated fastener to clamp the work piece at a clamping load and to swage a portion of the nut into the anti-rotation means on the elongated fastener.

The nut can be band annealed adjacent to the work piece engagement end. When so band annealed the first portion of the hollow bore of the nut adjacent the work piece engagement end is of a hardness which is less than the hardness of the remainder of the nut. This allows swaging of that first portion of the nut to lock the nut against rotation with respect to the elongated fastening element while retaining the remainder of the nut in a hardened condition.

BRIEF DESCRIPTION OF THE DRAWINGS

This invention will be better understood when taken in conjunction with the drawings wherein:

FIG. 5 is an enlarged fragmentary view of portions of FIG. 2.

Figures 1, 2, 3, 4:
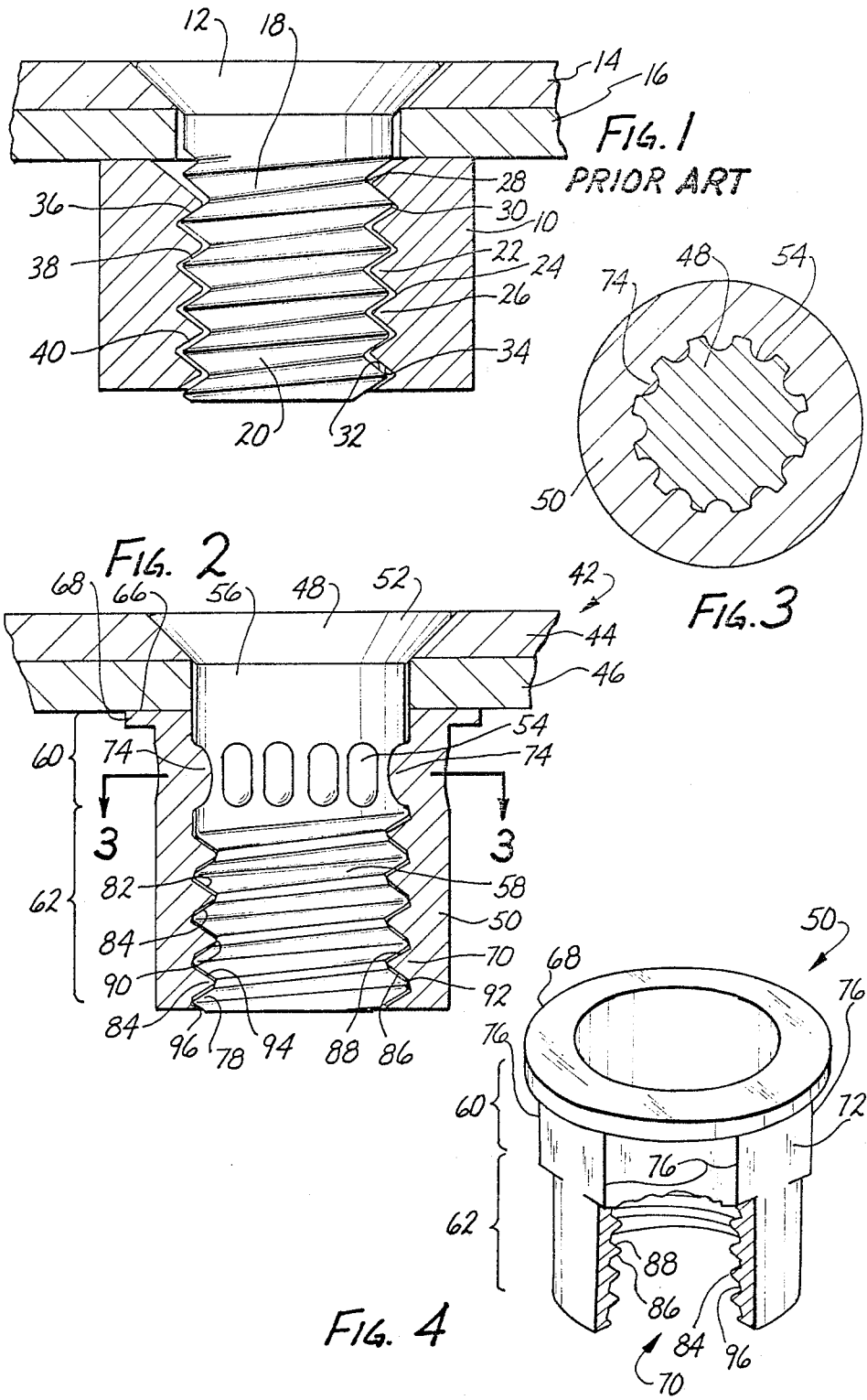
FIG. 1 is a side elevational view in partial section of a common prior art nut and bolt being utilized to secure a first work piece to a second work piece.
FIG. 2 is a side elevational view in partial section of a fastening assembly of the invention in a swaged state showing fastening of a first work piece to a second work piece.
FIG. 3 is a plan view in section about the line 3—3 of FIG. 2.
FIG. 4 is an isometric view in partial section of the nut utilized in the fastening assembly of FIG. 2 showing that nut in an initial "as manufactured" state.

This invention utilizes certain principles and/or concepts as are set forth in the claims appended hereto. Those skilled in the fastening arts to which this invention pertains will realize that these principles and/or concepts are capable of being illustrated in a variety of embodiments which may differ from the exact embodiments utilized for illustrative purposes herein. For this reason this invention is not to be construed as being limited to only the illustrative embodiments, but is only to be construed in view of the claims appended hereto.

DETAILED DESCRIPTION OF THE INVENTION

FIG. 1 illustrates a common nut 10 and bolt 12 being utilized to fix work pieces 14 and 16 together. Appropriate holes (not separately numbered or identified) have been drilled through the work pieces 14 and 16 to receive the shank 18 of the bolt 12. The nut 10 is then threaded onto the bolt 12 to secure the work pieces 14 and 16 together.

The bolt 12 includes an external set of threads 20. The nut 10 includes an internal set of threads 22. These are formed on the nut 10 and bolt 12 using appropriate taps and dies respectively.

Certain terminology is common in reference to both the external threads 20 of the bolt 12 and the internal threads 22 of the nut 10. The external threads 20 include crests, collectively identified by the numeral 24. In a like manner the internal threads 22 include crests collectively identified by the number 26. The external threads 20 include roots collectively identified by the numeral 28 and in a like manner the internal threads 22 also include roots collectively identified by the numeral 30.

The surface between a crest and a root irrespective of whether or not it is on an internal or an external thread is referred to as a side or flank, as for instance, sides 32 on the external threads 20 and sides 34 on internal threads 22. The pitch of the thread is the distance from one crest to the next crest (or the distance from one root to the next root). The major diameter of the thread is the diameter across the crests on the external threads (the diameter across the roots of the internal thread) and the minor diameter is the diameter across the roots of the external thread (the diameter across the crest of the internal thread).

The depths of the thread is the distance between the crest and the root measured normal to the axis whereas the angle of the thread is the angle between the sides of the thread measured in a plane through the axis of the thread.

In an American Standard thread or a Unified thread the angle of the thread is standardized at 6°. Thus, the angle between the sides measured across the root of an external thread is 60° as is the angle between the sides measured across the crests of an external thread. Normally in an American Standard thread and in a Unified thread the crests and the roots are truncated across a width of about ⅛ of the pitch. While this truncated area is normally flattened, it can vary depending upon the precision of the taps and dies utilized to form the threads.

In FIG. 1 in rotating the nut 10 onto the bolt 12, if the threads are right handed threads and the nut in being rotated clockwise, the nut can be considered as moving vertically up along the bolt or conversely the bolt can be considered as being pulled vertically downward into the nut.

It is evident in FIG. 1 in securing the work pieces 14 and 16 together with the nut 10 and the bolt 12 that the bolt shank 18, since it is formed of a metal, will elongate under tension. As a result of such elongation the first thread of the bolt 12 at the area identified by the numeral 36 takes up most of the locking load between the nut 10 and the bolt 12. A lesser amount of locking load is taken up at area 38 and little locking load taken up at more distal threads, as for instance, in the area 40.

In FIG. 2 a fastening assembly 42 of the invention is utilized to attach work piece 44 to work piece 46. The fastening assembly includes an elongated fastening element characterized by bolt 48 and a nut 50. The bolt 48 has a head 52 which can be considered as a retaining means which prevents axial movement of the bolt 48 in the direction going from work piece 44 to work piece 46.

The bolt 48 includes a plurality of circumferentially arrayed elongated grooves 54. The grooves 54 are axially aligned along the axis of the bolt 48. The grooves 54 provide a gripping surface or an anti-rotation means to which the nut 50 can be swaged (as hereinafter explained) to prevent rotation of the nut 50 with respect to the bolt 48. Intermediate the grooves 54 and the head 52 is a cylindrical shank area 56 which is smoothed and sized to closely fit within holes (not separately numbered or identified) in work pieces 44 and 46.

Outboard of the grooves 54 on the bolt 48 is an external thread 58. Thus, in moving along the bolt 48 from one end to the other, it has the head 52, the smooth cylindrical shank 56, the grooves 54 and the threads 58.

The nut 50 is illustrated in FIGS. 2 and 5 in a swaged or locked state. In FIG. 4 the nut 50 is illustrated in a initial or as manufactured state. In both of these states the nut 50 can be divided into two zones or portions. In both FIGS. 2 and 4 the first zone or portion is identified by the bracket 60 and the second zone or portion by the bracket 62.

The nut 50 has a hollow bore 64. The bore 64 extends through the nut starting at a work piece engagement end 66. The work piece engagement end 66 includes a flange 68 for butting against a work piece. In zone 60 adjacent to the work piece engagement end 66 the bore 64 is smooth. The bore 64 contains no threads in this zone or portion. In second zone 62 the bore 64 of the nut 50 includes a set of internal threads 70 formed therein. The threads 70 are sized to thread onto the external threads 58 of the bolt 48. The outside surface of the nut 50 includes a polygon shaped outer surface 72 in zone 60. This polygon shaped outer surface 72 is immediately adjacent the flange 68.

The nut 50, during manufacture thereof, can be band annealed (in a standard manner) about the zone 60 such that the hardness about zone 60 is less than the hardness of the nut in zone 62. Such band annealing about the zone 60 renders the material in zone 60 more malleable with respect to the material in the remainder of the nut 50 (in the zone 62). As such the material in the band annealed zone or band annealed portion of the nut 50 is capable of being swaged while the material in the remainder portions of the nut about zone 62 remains in a hardened condition maintaining the integrity of the threads 70.

In a manner as is described in my above referred to U.S. Pat. No. 4,682,520, the nut 50 is driven onto the bolt 48. Further material about the outer surface 72 of the nut 50 is then crimped inwardly by swaging. Both attachment of the nut 50 to the bolt 48 and swaging of the nut 50 to the bolt 48 can be accomplished with the swaging tool described in my U.S. Pat. No. 4,682,520.

Upon swaging, material of the nut 50 in area 74 (as seen in FIGS. 2, 3 and 5) is plastically repositioned into the grooves 54 on the bolt 48. This locks the nut 50 to the bolt 48 preventing rotation of the nut 50 about the bolt 48. As is evident in FIGS. 2, 3 and 5, material in the area 74 of the nut 50 intimately contacts the grooves 54 to form a complementary surface to the grooves 54 permanently fixing the nut 50 to the bolt 48.

In attaching work pieces 44 and 46 together, the nut 50 is rotated onto the bolt 48 utilizing the tool described in my above U.S. Pat. No. 4,682,520. The tool first contacts the polygon shaped outside surface 72 of the nut 50 to rotate the nut 50 onto the bolt 48. When the work piece engagement end 66 of the nut 50 engages the work piece 46 further threading of the nut onto the bolt applies a clamping load to the work pieces 44 and 46. As will be hereinafter explained, at the clamping load a frictional lock occurs between the treads 58 of the bolt 48 and the threads 70 of the nut 50 to lock these threads together.

After the threads are locked at the clamping load the tool of my U.S. Pat. No. 4,682,520 then rotates across the apices, collectively identified by the numeral 76, of the polygon surface 72 to displace material from the apices 76 inwardly into the area 74. This plastically displaced or cold flow material fills the grooves 54 creating an interlocking series of grooves and splines between the nut 50 and the bolt 48 as is seen in FIG. 3. This swaging of the material at the apices 76 of the nut 50 irreversibly fixes the nut 50 to the bolt 48. When the nut 50 is so fixed to the bolt 48 it is easily ascertained by visual inspection that the nut and bolt are intimately locked together. Further when utilized in a hostile environment, the nut 50 is prevented from being dislodged from the bolt 48.

As opposed to the common threads utilized in the fastening assembly of my U.S. Pat. No. 4,682,520, the threads 58 and 70 of the fastening assembly 48 are modified as is best seen in enlarged view of FIG. 5.

Contrary to the symmetrical shape of the threads described in FIG. 1, the threads 58 of the bolt 48 and the threads 70 of the nut 50 are asymmetrically shaped. That is, for any particular thread, as for instance, the external thread 58, the shape of the crowns of the threads is not the same as the shape of the roots of the threads.

Each of the individual threads of the threads 58, i.e. thread 58-A and thread 58-B of FIG. 5, have a rounded crest 78 (crests 78-A and 78-B respectively). The angle between the sides across the crests 78 is approximately 60°. In a like manner, the threads of threads 70, i.e. thread 70-A and 70-B of FIG. 5, have a rounded crest 84 (crests 84-A and 84-B respectively). As with the threads 58, the angle between the sides across the crest 84 is approximately 60°.

Spaced between the sides of the thread 58 are roots 90. Spaced between the sides of threads 70 are roots 92. The roots 90 of the thread 58 are asymmetrical with respect to both its own crests 78 and the crests 84 of the opposing mating thread 70 and the roots 92 of the threads 70 are asymmetrical with respect to both its own crests 84 and the crests 78 of the opposing mating thread 58.

For the purposes of this specification and the claims attached hereto in discussing the shape and asymmetry of the threads 58 and 70, identification of a thread as to being a leading thread or a trailing thread will facilitate the understanding of the invention. For the purposes of what is a leading thread and what is trailing thread, the following two part convention is utilized.

First, leading and trailing threads will be considered with respect to the roots, i.e. roots 94 of threads 58 and roots 90 of threads 70. Secondly, a leading or tailing thread is identified with respect to its position adjacent the thread root in the direction of movement of the component of the fastening assembly on which the root is located.

Using the above convention, the threads 58 of the bolt 48 are considered as moving downwardly in the nut 50 such that in FIG. 5 the thread leading root 90-B is thread 58-B and the thread trailing root 90-B is thread 58-A. The trailing thread, thread 58-A, is thus proximal to the bolt head 52 and the leading thread 58-B is distal from the bolt head 52.

For the nut 50, the threads 70 are considered as moving upwardly on the bolt 48. For root 92-A, the thread 70-A leads the root and the thread 70-B trails the root. Thus the leading thread, thread 70-A, is proximal to the work piece engagement end 66 of the nut 50 and the trailing thread, thread 70-B, is distal from the end 66.

The roots 90 of threads 58 have sides 80 and 82. For the root 90-B of threads 58, side 80-B is on the leading thread, thread 58-B, and thus is a leading side. Side 82-A is on the trailing thread, thread 58-A, and thus is a trailing side. Therefore, for the treads 58 leading sides are sides 80 and trailing sides are sides 82. In a like manner roots 92 of threads 70 have sides 86 and 88. For the root 92-A of threads 70, side 86-A is on the leading thread, thread 70-A, and thus is a leading side and side 88-B is on the trailing thread, thread 70-B, and thus is a trailing side. Therefore, for the threads 70 leading sides are sides 86 and trailing sides are sides 88. In FIG. 5, for the downwardly moving bolt threads 58 leading sides 80 are below trailing sides 82 and for the upwardly moving nut threads 70 leading sides 86 are above trailing sides 88.

In fastening assemblies of the invention, the roots on one of the threads, as for instance, the external threads 58 or the internal threads 70, but preferably the roots on both of the threads, the external threads 58 and the internal threads 70, are modified to be asymmetrical with respect to the crest on the opposing mating thread. To achieve such asymmetry the threads are modified in a manner such that the thread roots form a planar inclined surface which intersects the side of the thread leading the root at a first angle and intersects the side of the thread trailing the root at a second angle.

In the fastening assembly 48 of FIGS. 2 and 5, the roots 90 of the threads 58 have a root surface 94 and the roots 90 of threads 70 have a root surface 96. The root surface 94-B of threads 58 intersects the side 80-B of its leading thread 58-B at one angle of about 150° and intersects the side 82-A of its trailing thread 58-A at a different angle of about 90°. It is evident that the angle of intersect of the root surface 94 is different with respect to the sides of the leading and the tailing threads. In a like manner, the root surface 96-A of threads 70 intersects the side 86-A of its leading thread 70-A at a first angle of about 150° and intersects the side 88-B of its tailing thread 70-B at a second angle of about 90°. For both the asymmetrical threads 58 and 70 the angles their respective root surfaces make with the thread sides (90° and 150°) is different than the crest angle, that is the angle between the thread sides across the crests (60°).

As illustrated in FIG. 1 prior art nuts and bolts only contact each other about certain areas along the sides of their threads. Opposed to this in the fastening assemblies of the invention at clamping load, the nut, e.g. the nut 50, contacts the bolt, e.g. bolt 48, by frictionally locking of thread crest against the asymmetrical thread root of the opposing thread. As, for instance, crests 78 of threads 58 frictionally locks against the root surfaces 96 of threads 70.

As seen in FIG. 5, in a locking engagement each of the respective crests, e.g. crests 78-A and 78-B of the threads 58 and crests 84-A and 84-B of the internal threads 70, locks against the asymmetrical or noncomplementary root of the opposing thread, e.g. roots 92-A and 92-B of the threads 70 and roots 90-A and 90-B of the threads 58, respectively. Because of this, even loading is achieved along the totality of the threads, both the external threads 58 and the internal threads 70 of the bolt 48 and nut 50. Further, a large frictional engagement surface is created between the asymmetrical contact of the noncomplementary rounded crest and planar inclined roots.

As a consequence of the above, an even uniform loading is achieved along the length of the threads of the nut and bolt 50 and 48. Because of such even uniform loading for any given tensile strength requirement, the thread length can be reduced. By reducing the thread length the overall size of the nut 50 can be reduced resulting in a weight savings.

Irrespective of increased frictional engagement of the noncomplementary crests and roots of the fastening assemblies of the invention, once the clamping load between the work pieces is achieved the nut of the fastening assembly is then permanently locked to the bolt of the fastening assembly. Locking is achieved by swaging a portion of the material of the nut to grooves or other anti-rotation means located on the bolts of the fastening assemblies of the invention. The nuts of the fastening assemblies of the invention are therefore, doubly locked to the bolts utilizing as a first lock the highly frictional uniform loading of the asymmetrical threads and as a second lock the swaging of a portion of the nut into respective grooves in the bolt.

Because of the different inclination of the planar root surfaces of the fastening assemblies of the invention with respect to the sides of both the leading and the trailing thread, during run up of the nut on the bolt the crests of both the external and the internal threads tend to become located adjacent the 90° angular area on the opposing thread between the respective planar root surfaces 94 or 96 and the respective tailing sides 82 on the threads 58 or 88 on the threads 70. This allows the nut to freely rotate onto the bolt until the clamping load is achieved.

Once the work piece clamping load between the nut 50 and bolt 48 is initiated, further rotation of the nut tends to relocate the crests 78 and 84 of the respective threads 58 and 70 against the incline of the root surfaces 94 or 96 in a direction toward the larger 150° angle in the respective roots 90 and 92. As was noted above this large angle is formed between the root surface 94 or 96 and the side 80 or 86 of the respective tailing thread. Movement of the thread crests 78 or 84 up the incline of the root surfaces 94 or 96 towards the 150° angle frictionally locks or fixes the threads to one another.

The inclined root surface need only be included on threads of one or the other of the bolt 48 or the nut 50 to achieve the high frictional uniform loading of the threads. However, by including an inclined root surface on the threads of both the nut and the bolt, greater contact area between the nut and the bolt is achieved at the clamping load.

For the purposes of illustration, a bolt 48 having a head 52 has been described. It is, of course, recognized that the bolt 48 can be chosen to have various geometries depending upon its use and the work pieces it is attached to. In the Figures, for illustrative purposes, the bolt 48 was illustrated with a countersunk head. Other head geometries as, for instance hexagon, flat, round, fillister, and the like, can be selected depending upon the work pieces and the environment on which the fastening assemblies of the invention are utilized.

Additionally in place of a bolt as the elongated fastening element of the fastening assemblies of the invention, a stud might be used. Such a stud could be locked to a work piece at one of its ends via appropriate expedients such as pins or the like. A nut of the invention, for example nut 50, would then be used to attach a further work piece to such a stud. Further, an elongated fastening element could including a nut of the invention on each end. One of these nuts (in the manner of nut 50 above) would serve as a retaining means preventing movement of the assembly in one direction though work pieces and the other of the nuts (also in the manner of nut 50 above) would serve to prevent movement in the other direction.

I claim:

1. A fastening assembly comprising:

an elongated fastening element and a nut;

said elongated fastening element having a retaining means at one end for maintaining said fastening element against axial movement in a first direction in a hole in a workpiece to be fastened;

said elongated fastening element further including external threads adjacent its other end, and a shank area intermediate said retaining means and said threads;

said elongated fastening element including anti-rotation means for providing a gripping surface opposing rotation about said elongated fastening element, said anti-rotation means independent of said threads and located on a portion of said shank area adjacent said threads;

said nut having a workpiece engagement end and a hollow bore extending through said workpiece engagement end into said nut;

a first portion of said hollow bore proximal to said work piece engagement end of said nut being free of threads, a second portion of said hollow bore distal from said workpiece engagement end having internal threads, said internal threads on said second portion of said hollow bore of said nut capable of threading onto said external threads on said elongated fastening element to clamp a workpiece under a clamping load between said elongated fastening element retaining means and said workpiece engagement end of said nut;

the threads of at least one of said internal and said external threads being asymmetric threads, said asymmetric threads having a thread root of a shape which is noncomplementary to the shape of the thread crest of its opposing mating thread whereby the crest of the opposing mating thread frictionally locks against the noncomplementary root when said workpiece engagement end of said nut is brought against a workpiece at said clamping load;

said asymmetric threads including an essentially planar inclined root surface, said inclined surface intersecting the side of the thread leading the root at a first angle of about 150° degrees and intersecting the side of the thread trailing the root at a second angle of about 90° degrees, the crest of the opposing mating thread fictionally locking against said inclined surface when said workpiece engagement end of said nut is brought against a working piece at said clamping load;

said first portion of said hollow bore of said nut capable of being swaged into intimate contact with said anti-rotation means on said elongated fastening element to fix said first portion of said nut to said elongated fastening element against rotation of said nut on said elongated fastening element.

2. A fastening assembly comprising:

an elongated fastening element and a nut;

said elongated fastening element having a retaining means at one end for maintaining said fastening element against axial movement in a first direction in a hole in a workpiece to be fastened;

said elongated fastening element further including external threads adjacent its other end, and a shank area intermediate said retaining means and said threads;

said elongated fastening element including anti-rotation means for providing a gripping surface opposing rotation about said elongated fastening element, said anti-rotation means independent of said threads and located on a portion of said shank area adjacent said threads;

said nut having a workpiece engagement end and a hollow bore extending through said workpiece engagement end into said nut;

a first portion of said hollow bore proximal to said work piece engagement end of said nut being free of threads, a second portion of said hollow bore distal from said workpiece engagement end having internal threads, said internal threads on said second portion of said hollow bore of said nut capable of threading onto said external threads on said elongated fastening element to clamp a workpiece under a clamping load between said elongated fastening element retaining means and said workpiece engagement end of said nut;

the threads of at least one of said internal and said external threads being asymmetric threads, said asymmetric threads having a thread root of a shape which is noncomplementary to the shape of the thread crest of its opposing mating thread whereby the crest of the opposing mating thread frictionally locks against the noncomplementary root when said workpiece engagement end of said nut is brought against a workpiece at said clamping load;

said asymmetric threads including an essentially planar inclined root surface, said inclined surface intersecting the side of the thread leading the root at a first angle and intersecting the side of the thread trailing the root at a second angle, wherein said first angle and said second angle are different, the crest of the opposing mating thread frictionally locking against said inclined surface when said workpiece engagement end of said nut is brought against a working piece at said clamping load;

said first portion of said hollow bore of said nut capable of being swaged into intimate contact with said anti-rotation means on said elongated fastening element to fix said first portion of said nut to said elongated fastening element against rotation of said nut on said elongated fastening element.

3. A fastening assembly of claim 2 wherein:

a further portion of said shank area of said elongated fastening element includes a smooth cylindrical area for fitting in a hole in a work piece to be fastened, said smooth cylindrical area located adjacent said retaining means between said retaining means and said anti-rotation means.

4. A fastening assembly of claim 2 wherein
said elongated fastening element comprises a bolt; and
said retaining means comprises a bolt head on said bolt.

5. A fastening assembly of claim 2 wherein:
said nut includes an outside surface; and
at least the portion of said outside surface of said nut which overlays said unthreaded first portion of said hollow bore is polygon shaped in cross section prior to swaging said portion of said outside surface of said nut against said elongated fastening element.

6. A fastening assembly of claim 2 wherein:
said nut about said first portion of said hollow bore adjacent said work piece engagement end is of a first hardness and said nut about said second portion of said bore is of a second hardness; and
wherein said second hardness is greater than said first hardness.

7. A fastening assembly of claim 2 wherein:
said anti-rotation means includes said elongated fastener having a plurality of axially extending grooves located on said shank area adjacent to said external threads for providing a gripping surface opposing rotation about said elongated fastener element.

8. A fastening assembly of claim 2 wherein:
said first angle is greater than said second angle.

9. A fastening assembly of claim 3 wherein:
said bolt including a plurality of axially extending grooves located on said shank area adjacent said threads, said axially extending grooves for providing a gripping surface opposing rotation about said bolt;
the remainder of said shank area between said grooves and said head being cylindrical in shape for closely fitting in a hole in a work piece to be fastened.

10. A fastening assembly of claim 9 wherein:
said nut includes an outside surface; and
said outside surface of said nut overlaying said unthreaded first portion of said hollow bore is polygon shaped prior to swaging against said bolt.

11. A fastening assembly of claim 10 wherein:
said nut about said first portion of said hollow bore adjacent said work piece engagement end is of a first hardness and said nut about said second portion of said bore is of a second hardness; and
wherein said second hardness is greater than said first hardness.

12. A fastening assembly of claim 9 including:
a swaging tool;
said nut having an outside surface;
said swaging tool having a hollow interior, said swaging tool hollow interior including means for:
 (a) contacting the outside surface of said nut,
 (b) rotating said nut on said bolt until said work piece engagement end of said nut abuts a work piece and clamps said work piece at said clamping load,
 (c) frictionally locking said crest of said opposing mating threads against said planar inclined root surface of said asymmetric threads at said clamping load, and
 (d) swaging said first portion of said hollow bore of said nut into intimate contact with said grooves on said bolt.

13. A fastening assembly of claim 12 wherein:
said outside surface of said nut is polygon in shape; and
said means included in said interior of said swaging tool interacting with said polygon shape of said nut to contact said nut, to rotate said nut, to frictionally lock said nut to said bolt, and to swage a portion of the apices of said polygon shaped outside surface of said nut inwardly swaging a portion of said nut into said grooves on said bolt.

* * * * *